United States Patent [19]

Ina

[11] 4,212,601
[45] Jul. 15, 1980

[54] MOTOR PUMP

[75] Inventor: Yoshifumi Ina, Okazaki, Japan

[73] Assignee: Nippondenso Co., Ltd., Kariya, Japan

[21] Appl. No.: 932,933

[22] Filed: Aug. 11, 1978

Related U.S. Application Data

[63] Continuation-in-part of Ser. No. 802,532, Jun. 1, 1977, Pat. No. 4,181,473.

[30] Foreign Application Priority Data

Jul. 1, 1976 [JP] Japan .................................. 51-78567
Jul. 1, 1976 [JP] Japan .................................. 51-78568
Aug. 22, 1977 [JP] Japan ................................. 52-100275

[51] Int. Cl.² ...................... F04B 17/02; F04B 35/00
[52] U.S. Cl. ........................................ 417/365; 417/366
[58] Field of Search ................ 417/366, 365, 423 R, 417/424, 284; 418/102

[56] References Cited

U.S. PATENT DOCUMENTS

| 3,754,844 | 8/1973 | Nusser et al. | 417/423 R |
| 3,836,291 | 9/1974 | Bottcher et al. | 412/423 R |
| 3,850,550 | 11/1974 | Kaessen | 417/424 |

Primary Examiner—Richard E. Gluck
Attorney, Agent, or Firm—Cushman, Darby & Cushman

[57] ABSTRACT

A motor pump comprises a DC motor unit, a pump unit and a cover housing for the motor and pump unit; the motor unit includes a cup-shaped yoke with the bottom having a bearing, and a bearing holder is fitted into an opening in the cup-shaped yoke to thereby hold an armature shaft of the motor unit in position with respect to the yoke. The pump unit has a pump stator secured to the bottom of said cup-shaped yoke and a pump rotor connected to the armature shaft by key arrangement. The pump stator has a passage communicating the gap in the key arrangement and the pump inlet. As a result, fuel in the gap is prevented from stagnating therein, thereby preventing rusting of the pump components.

5 Claims, 1 Drawing Figure

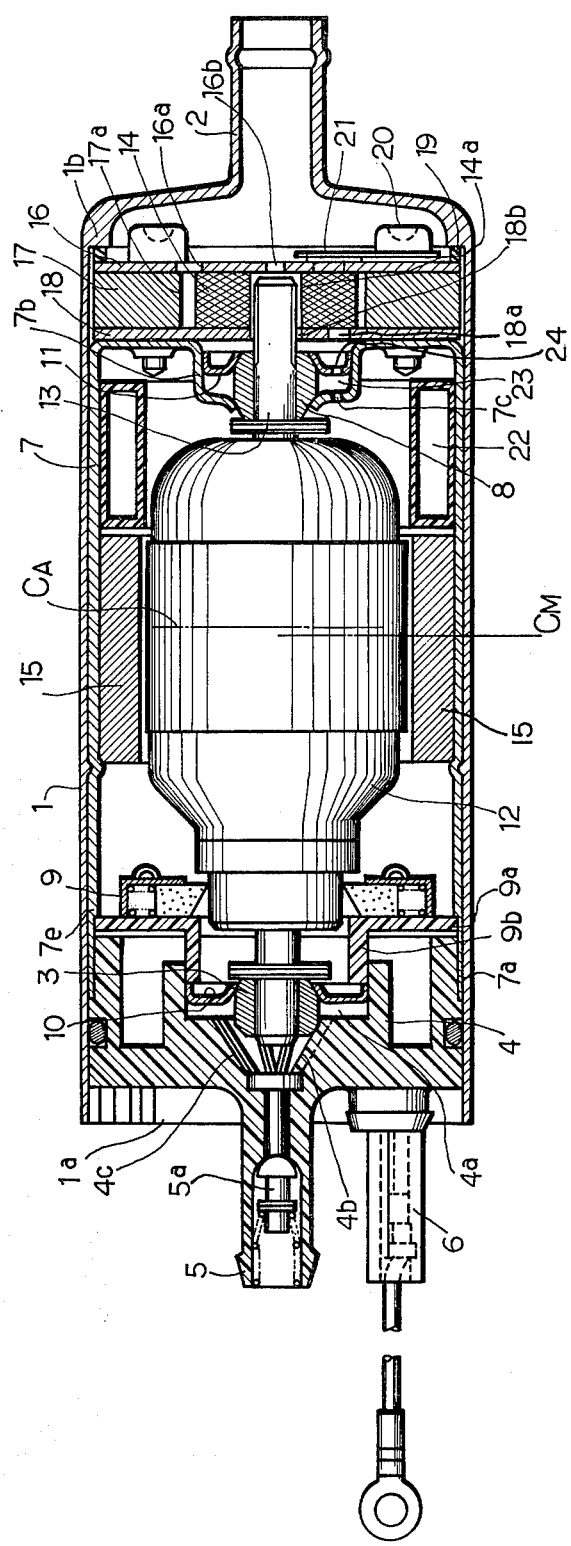

MOTOR PUMP

This application is a continuation-in-part of my copending application Ser. No. 802,532, filed June 1, 1977, now U.S. Pat. No. 4,181,473 the contents of which is incorporated hereinto by reference.

BACKGROUND OF THE INVENTION

The present invention relates to an improved construction of a motor-driven fuel pump for an internal combustion engine.

In my aforesaid parent application Ser. No. 802,532, there is proposed an improved fuel pump arrangement in which a motor unit has a cup-shaped motor housing and bearings so that it may be operated for a test before a pump unit is installed on a bottom portion of the motor housing. A pump rotor is carried by one end of a motor shaft extending from the bottom portion of the motor housing through key or spline arrangement. In the above construction, rust may gather on the surface of the key or spline arrangement of the motor shaft and the pump rotor.

SUMMARY OF THE INVENTION

It is a main object of the present invention to provide a simple and inexpensive rust free motor pump structure.

It is another object of the present invention to provide a rust free motor pump in which fuel in small gaps is caused to flow, preventing the rust from gathering in the gaps.

BRIEF DESCRIPTION OF THE DRAWINGS

The attached drawing is a sectional view of the embodiment according to the present invention.

DETAILED DESCRIPTION OF THE PREFERRED EMBODIMENT

A preferred embodiment according to the present invention will be explained with reference to the attached drawing.

An aluminum cylindrical housing 1 has integral inlet pipe 2 at one end and an opening 1a at the other. A bearing holder 4 is received by and secured fluid tightly to the opening 1a. The bearing holder 4 has an integral outlet pipe 5 and an electric terminal 6, and is formed with an annular recess 4a in which a conical surface 4b is further formed to receive a bearing 3 thereon. The outlet tube 5 is communicated with the recess 4b through radially extending grooves 4c formed on the conical surface 4b. A check valve 5a is disposed in the outlet tube 5. A cup-shaped yoke member or motor housing 7 of high magnetic permeability (ferromagnetic) is telescoped into the housing 1. The motor housing has an opening 7a to which the bearing holder 4 is also received and a bottom in which a bend 7b is formed with an opening to receive a bearing 8, and an opening 7c is also formed to have communication of the outside of the motor housing with the inside thereof. A brush assembly 9 has a disk plate member 9a which is fitted into a shoulder 7e formed on an internal surface of the motor housing 7. The disk member 9a has a plurality of arms 9b extending axially therefrom to retain the bearing 3 through a rocking washer 10. The other bearing 8 is also retained by a rocking washer 11 which is fixed to the internal surface of the bend 7b. An armature 12 having a shaft 13 axially extending to be carried by the bearings 3 and 8 at the opposite ends. One end of the shaft 13 extends from the bottom portion of the motor housing and from the bearing 8 and is formed with key ways or splines to carry a pump rotor 14 of a roller type pump unit. Two arcuate permanent magnets 15, 15' having the same outer circumference as the inside of the motor housing 7 are secured to the latter. Preferably, the magnets are positioned so that the center line $C_M$ thereof is shifted from the center line $C_A$ of the armature core to provide a magnetic force in the axial direction.

Since the bearing holder 4, bearings 3 and 8, armature 12 and the magnets 15, 15' are all secured to the motor housing 7, the motor operation may be tested before other components such as housing 1 and pump rotor 14 are assembled. A pump unit is interposed between the bottom portion of the motor housing 7 and, through a rubber cushion 19, a shoulder 1b formed in the housing 1 adjacent the inlet pipe 2.

The pump unit comprises a pump stator including a spacer cover plate 16 a spacer ring 17 and a spacer sheet 18 to define a pump chamber and the rotor 14 disposed in the chamber. The pump stator is secured to the bottom portion of the motor housing 7 by bolts 20. The spacer cover plate 16 has a pump inlet port 16a for introducing fluid from the inlet pipe 2, a pressure regulator valve 21 and a central opening 16b. The spacer ring 17 has a bore 17a within which the pump rotor rotates to pump up fluid from the pump inlet 16a. The spacer sheet 18 has a pump outlet 18a from which fluid is driven into the inside of the motor housing and has a central bore 18b through which the shaft 13 extends. The pump rotor 14 has a central bore 14a in which key ways or splines are formed to engage with keys or splines provided on the shaft 13 so that the pump rotor 14 may be driven by the shaft 13. The gap formed in the key or spline arrangement between the rotor central bore 14a and the shaft 13 is in communication with the inlet pipe 2 through the central opening 16b of the spacer cover 16. An annular hollow member 22 made of elastic material is disposed in the space between the magnets 15, 15' and the bottom portion of the motor housing 7 and secured to the latter.

In operation, when the armature is energized through the terminal 6, brushes of brush assembly 9, it rotates and drives the pump rotor 14 of the pump unit. As a result, fuel is sucked from the inlet tube 2 through the pump inlet 16a and driven out of the pump outlet 18a through window 24 into the space 23 between the pump unit and the bottom portion of the motor housing 7. The fuel then passes around the bearing 8 to cool same and fills the inside of the motor housing 7 through the openings 7c. When fuel fills up the motor housing 7 and establishes a delivering pressure, it flows through the radially extending grooves 4c and the check valve 5a out of the outlet pipe 5, cooling the bearing 3. When the fuel pressure further increases and exceeds a preset value, e.g. 5 atms, the pressure regulating valve operates to discharge a portion of the fuel, keeping the fuel pressure within such a preset value.

Since the annular hollow member 22 is made of elastic material, it contracts or expands in response to the fluctuation of the fuel pressure to thereby smooth the supplied fuel pressure. Further, since the magnets are positioned to bias the armature core as described before, pressure unbalance between the opposite ends of the shaft 13 may be compensated.

During operation, a portion of fuel flows from the space 23 between the pump unit and the bottom portion of the motor housing through window 24, the central bore 18b of the spacer sheet 18 and the gap in the key or spline arrangement between the rotor central bore 14a and the shaft 13 and the central opening 16b to the inlet pipe 2. As a result, fresh fuel is always supplied in the gap between the central bore 14a and the shaft 13 so that rust is prevented from gathering.

What we claimed is:

1. A motor pump comprising:
   a motor unit including a cup-shaped ferromagnetic yoke member having one end open, the other end being a bottom portion having an opening, magnetic field supplying means in said yoke member, an armature integral with a shaft having a portion extending through said opening in the bottom of said cup-shaped yoke member, a bearing holder sealed securely to said open end of said cup-shaped yoke member having a fluid outlet member, and first and second bearing means secured respectively in said opening in the bottom portion of said cup-shaped yoke member and to said bearing holder for carrying said shaft, and
   a pump unit including a pump stator secured to the bottom portion of said cup-shaped yoke member for defining a pump chamber into which said shaft extends, a rotor disposed in said pump chamber, and a fluid inlet member for communicating said fluid inlet member with said pump chamber and a pump outlet member for communicating said pump chamber with the inside of said motor unit,
   connecting means including at least one keyway and a key tpe member mating therewith with a gap therebetween for connecting said shaft and rotor,
   said pump stator further having means for communicating said connecting means including said gap with said fluid inlet member to cause fluid flow in a direction from said motor unit to said fluid inlet member to prevent rust from gathering on said connecting means including said gap.

2. A motor pump according to claim 1, wherein said motor unit further comprises an expansible annular hollow member secured within said cup-shaped yoke member between said magnetic field supplying means and the bottom portion of said cup-shaped yoke member.

3. A motor pump according to claim 1, wherein said magnetic field supplying means is positioned to bias said armature to compensate for pressure unbalance between the opposite ends of said shaft.

4. A motor pump as in claim 1, 2, or 3 wherein said magnetic field supplying means includes a plurality of magnets.

5. A motor pump as in claim 1, 2 or 3 wherein said pump stator has a first plate on the inlet side of said rotor with an off-center inlet port and a second plate on the outlet side of said rotor with an off-center outlet port, said communicating means including central openings in said first and second plates.

* * * * *